United States Patent [19]

Schlosser et al.

[11] Patent Number: 5,069,196
[45] Date of Patent: Dec. 3, 1991

[54] PIVOTING AUXILIARY RACK

[75] Inventors: Erich J. Schlosser, Barrington; J. Michael Alden, Palatine, both of Ill.

[73] Assignee: Weber-Stephen Products Co., Palatine, Ill.

[21] Appl. No.: 571,735

[22] Filed: Aug. 23, 1990

[51] Int. Cl.[5] ............................................. F24C 15/30
[52] U.S. Cl. .............................. 126/25 R; 126/25 A; 126/337 R
[58] Field of Search ................ 126/25 R, 25 AA, 332, 126/338, 337 R, 25 A

[56] References Cited

U.S. PATENT DOCUMENTS

| | | | |
|---|---|---|---|
| 2,814,286 | 11/1957 | Arnold | 126/29 X |
| 3,079,854 | 3/1963 | Shepherd | 126/25 R |
| 4,054,123 | 10/1977 | Corter | 126/25 R X |
| 4,829,977 | 5/1989 | Valentine | 126/25 R X |

FOREIGN PATENT DOCUMENTS 902024  6/1972  Canada .............. 126/25 R

*Primary Examiner*—Larry Jones
*Attorney, Agent, or Firm*—Wallenstein, Wagner & Hattis, Ltd.

[57] ABSTRACT

An auxiliary rack assembly (60) that is fastened to the bottom (11) of a barbecue kettle (10) is disclosed. The assembly (60) includes an auxiliary grid (61) for holding items above or to the side of a cooking grid (42). The auxiliary grid (61) has a plurality of posts (62) connected its perimeter for supporting a rail (63). The assembly (60) also includes a rigid articulating arm (90) with two ends (91,93) and a cantilever section (92) disposed therebetween and separated therefrom by elbows (94,95). The arm (90) is interconnected at one end by a kettle bracket member (80) and at the other end to the auxiliary grid (61). The kettle bracket (80) is fastened to the kettle (11) and permits rotation of the articulating arm (90) interconnected thereto. The grid (60) can also be interconnected to a rack bracket member (85) which permits further rotation of the articulating arm (90) interconnected thereto.

9 Claims, 1 Drawing Sheet

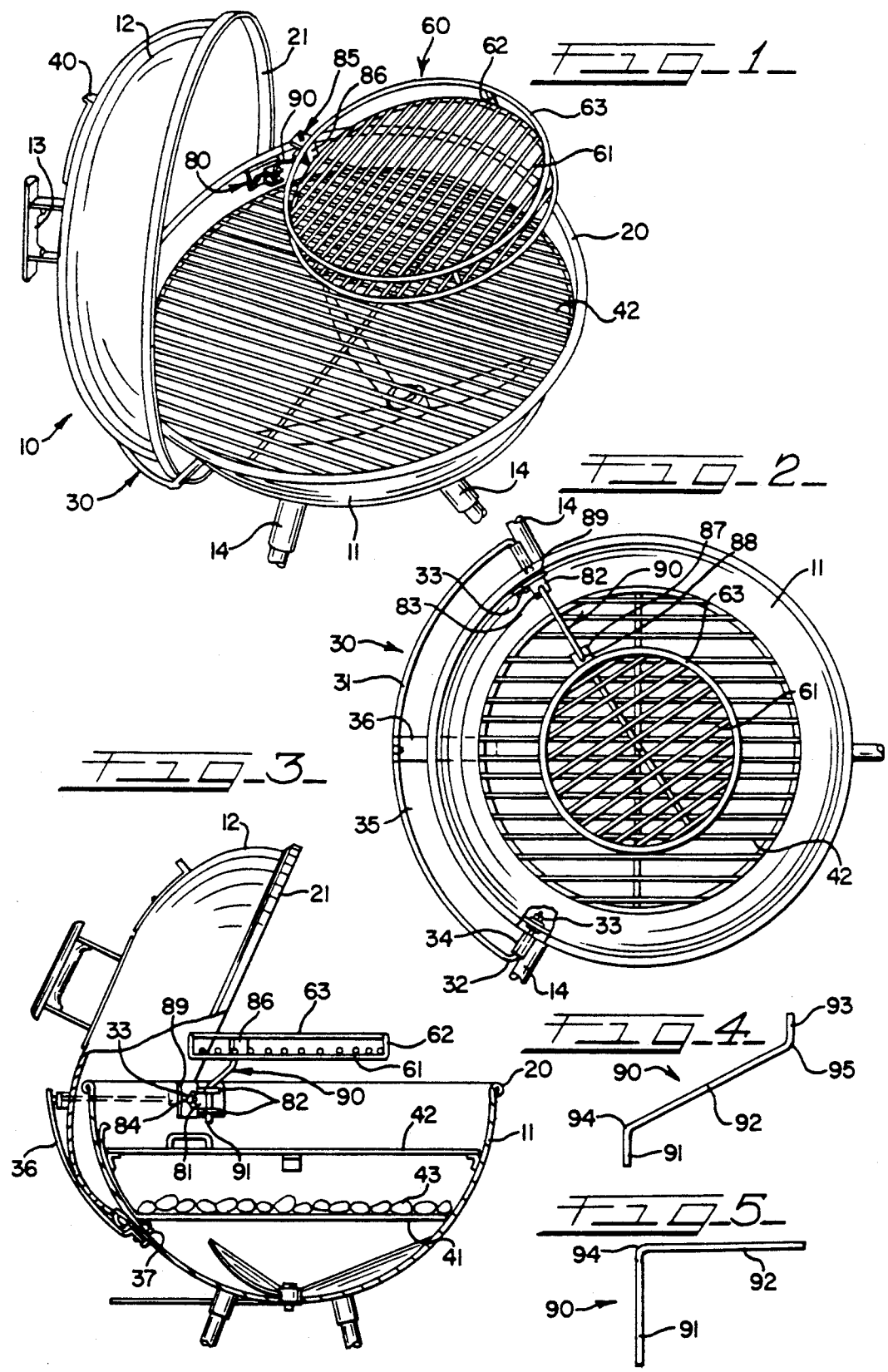

PIVOTING AUXILIARY RACK

DESCRIPTION

1. Technical Field

The present invention relates generally to kettle-type barbecue grills and, more particularly, to pivoting auxiliary racks that can be attached to the bottom of such grills.

2. Background Prior Art

Kettle-type grills are very widely used today. Presently, one of the most popular grills is being marketed by the Assignee of the present invention. This barbecue kettle consists of a generally semihemispherical bottom bowl that has a circular open top with a cooking grid slightly below the upper rim of the bowl. A generally semihemispherical top cover can be placed on the bottom bowl. Also, the bowl is supported on a tripod leg arrangement. This kettle configuration is a registered trademark of the Assignee of the present invention.

Barbecue kettles that are designed for burning charcoal as a fuel also have a second grid for supporting the charcoal below the cooking surface. Both the bowl and cover have vent openings to provide the necessary oxygen for combustion of the charcoal while the cover is closed.

One type of barbecue kettle that has received very favorable acceptance by consumers is disclosed in U.S. Reissue Pat. No. 33,091, owned by the Assignee of the present invention, which is sold under the trademark ONE-TOUCH ®.

Typically, an individual cooking on the grill paces the items to be cooked on the cooking grid. If the individual wants to warm food, like a bun, for example, the individual either arranges what was previously on the grid to make room for the new item, or places the item on the available open grid spaces. In any event, most often, because of the intensity of the heat, the item intended to be warmed must be carefully watched to avoid its being burned or overcooked. While additional stationary racks or stands above the grid for such items to be warmed might prevent burning, they would, unfortunately, get in the way of and pose an obstacle to anyone cooking food on the cooking grid.

SUMMARY OF THE INVENTION

According to the primary aspect of the present invention, a pivoting auxiliary rack assembly is developed which can support items in a spaced position above the cooking grid that is supported in the bottom of a barbecue kettle. The assembly can be maneuvered over the grid or to the side of the grid. Moreover, the assembly is constructed to avoid contact with a closed kettle cover.

The assembly of the present invention includes an auxiliary grid for holding and warming items, such as buns and corn. To keep these items from falling off the auxiliary grid, there is a rail above the perimeter of this grid. This rail is supported by a plurality of posts attached to the grid's perimeter and connected to the rail.

Connected to the auxiliary grid is a rigid articulating arm that has an upper end, an opposite lower end and a cantilever section disposed therebetween. An elbow separates each end from the cantilever section. This arm maintains the auxiliary grid spaced above the cooking grid and away from the kettle's bowl. The arm is interconnected at its upper end to the auxiliary grid.

The lower end of the articulating arm is rotatably connected to a kettle bracket member fastened to the bottom of the kettle. The kettle bracket includes a main section attached to the kettle and two generally parallel transverse portions projecting therefrom. Each transverse portion has an aperture therein for receiving the lower end of the arm threaded therethrough and for permitting rotation therein.

According to another aspect of the invention, the assembly can be dual pivoting for greater versatility and maneuverability. To construct such a dual pivoting assembly, a rack bracket member is fastened to the auxiliary grid. This bracket can be constructed similar to the kettle bracket member, and the upper end of the arm can be threaded through this bracket's apertures in the parallel transverse portions.

With this auxiliary rack assembly, an individual cooking items on the cooking grid can simultaneously heat other items on the rack assembly. If desired, the individual can pivot or rotate the rack directly over the kettle, over only part of the kettle, or completely away from the kettle. While the rack is directly over the bottom, the cover can be closed. Moreover, because of the rails attached to the auxiliary grid, the rack is like a basket, in that items will not easily fall out of it.

Other advantages and aspect of the present invention will become apparent upon reading the following description of the drawings and the detailed description of the invention.

BRIEF DESCRIPTION OF DRAWINGS

FIG. 1 is a perspective top view of a barbecue kettle with an auxiliary rack assembly made in accordance with the teachings of the present invention attached to it;

FIG. 2 is a top view of the bottom bowl of the kettle of FIG. 1 with the auxiliary rack attached to it;

FIG. 3 is a partial side sectional view of the barbecue kettle with the auxiliary rack assembly made in accordance with the teachings of the present invention attached to it;

FIG. 4 is a side view of one articulating arm made in accordance with the teachings of the present invention; and, FIG. 5 is a side view of another, alternative articulating arm made in accordance with the teachings of the present invention.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to embodiments illustrated.

The kettle-type barbecue grill 10, as shown in FIG. 1, is of a well-known configuration and has been sold by the Assignee of the present invention for more than 25 years. It comprises a generally semihemispherical bottom bowl 11 and a generally semi-hemispherical, removable cover 12. The bowl 11 has an upper edge or lip 20, while the cover 12 has a sealing rim 21. The rim 21 is dimensioned to fit snugly around the lip 20 so that a substantially air-tight seal is developed between the bowl 11 and the cover 12. The bowl and cover are preferably formed from porcelain-coated enamel. Handles 13 are provided at the top of the cover 12 and on the sides of the bottom 11 (not shown). The kettle 10 is generally constructed in accordance with the teachings of U.S. Reissue Pat. No. 33,091. The bottom 11 is supported by the tripod leg arrangement 14 of the type shown disclosed in U.S. Pat. No. 3,538,906, all of these patents being incorporated herein by reference. The kettle's legs 14 are secured to the bottom 11 to support the kettle at a convenient height.

The kettle 10 also includes a cover holder 30 which is attached to the exterior of the bottom 11 to hold the cover 12 while the kettle is opened. This cover holder 30 is generally made in accordance with the one taught in U.S. Pat. No. 4,777,927, which is also incorporated herein by reference. Specifically, as shown in FIG. 2, the cover holder 30 includes a generally circular rod 31 having opposite end portions 32 extending at right angles from the arcuate center portion. The end portions 32 have a flattened portion that acts as an abutment extending through openings in the bowl, being secured thereto by nuts 33 received on the threaded portions of ends 32. A pair of nonmetallic nylon rollers 34 are rotatably supported on the bent end portions 32. The arcuate circular rod 31 thus defines a generally arcuate slot 35 adjacent the upper peripheral edge of the bowl and is configured to receive the cover 12.

The cover holder 30 also includes an elongated strap 36 connected at one end to the rod 31 at the center thereof, and connected at the other end to the bowl 11 by a bolt and nut assembly 37 (FIG. 3).

A shutter-type damper 40 is rotatably secured to the cover 12 and employed to control the air flow through openings (not shown) in the cover, which is conventional in present commercial grills. As illustrated in FIG. 3, a support grid 41 is placed within the kettle and spaced a short distance above the bottom of the bowl to hold the solid fuel (such as charcoal briquettes 43), which are burned in the barbecuing procedure. Spaced above the support grid 41 and below the bowl's upper lip 20 there is a cooking grid 42 on which to place the food being cooked.

As shown in FIG. 1, the auxiliary rack 60 is connected to the bottom bowl 11 and cantilevered out away from the bowl 11 and above the cooking grid 42, which is supported in the bottom bowl 11 of the kettle 10. Consequently, the rack 60 can be rotated or pivoted in a horizontal plane above the cooking grid 42. Specifically, the auxiliary rack 60 is always a constant distance above the cooking grid 42.

The rack 60 has an auxiliary grid 61 which is constructed similarly to the cooking grid 42. However, for easier maneuverability and to cause less obstruction to items on the cooking surface 42, it is preferable that the auxiliary grid 61 be smaller in area than the cooking grid 42. In this manner, the rack 60 can be pivoted completely or partially over the cooking grid 42, or it can be swung to the side of the cooking grid 42. However, the auxiliary grid 61 is always a constant distance above the cooking grid 42.

Items such as buns, cooked food and vegetables can be placed on this rack 60 and warmed while other items, such as meat, poultry or fish, are being cooked on the cooking grid 42. Such cooking and warming can be done simultaneously. Since the distance between the auxiliary grid 61 and the fuel 43 is greater than the distance between the cooking grid 42 and the fuel 43, the heat and temperature are less intense and lower at the auxiliary grid 61. Preferably, the auxiliary grid 61 is spaced above the cooking grid 42 so that the rack will not contact most items on the cooking grill 42 when the rack 60 is pivoted above them. And, when the cover 12 is closed onto the bowl 11, the auxiliary rack assembly 60 will not contact the cover 12.

The auxiliary rack 61 also has a rail 63 positioned above the perimeter of the auxiliary grid 61 to prevent items from falling off this grid 61. Thus, when the rack is pivoted, items may slide on the auxiliary grid 61 without any fear of them falling onto the cooking grid 42, the items being cooked thereon, the briquettes 43, the stored cover 12 or the ground. The rail 63 is supported by a plurality of posts 62, which can be welded to the grid 61 and the rail 63, or can be upturned portions of the grid 61 welded to the rail 63.

A rigid articulating arm 90 is also connected to the grid 61 to support it. This arm 90 is constructed for the purpose of cantilevering the grid 61 above the cooking grid 42 and the lip 20 of the kettle's bowl 11. Specifically, as shown in FIG. 4, the articulating arm has three sections, a lower end 91, an opposite upper end 93, and a cantilever section 92 disposed between the two. Elbows 94,95 separate these two sections. In particular, the two vertical portions, the ends 91,93, are for rotatably connecting the arm 90 to the bowl 11 and the grid 61; the cantilevered section 92 is for spacing the grid away and above the kettle's bowl 11 and lip 20. In the preferred embodiment the articulating arm 90 is constructed of a metal rod or wire of sufficient thickness to support the anticipated loads.

The upper end 93 of the arm 90 is attached to the auxiliary grid 61. As generally shown in FIGS. 1 and 2, this upper end 93 of the articulating arm 90 can be welded to the bottom or the side of this grid 61.

The lower end 91 of the arm 90 is rotatably interconnected to a kettle bracket member 80 which is fastened to the bottom bowl 11 of the kettle 10. While the articulating arm 90 has been shown to have three sections, the vertical ends and the slanted cantilever section 92 disposed therebetween can also be L-shaped, as shown in FIG. 5. In the generally L-shaped embodiment, the lower end 93 is vertical and the cantilever section is generally horizontal. There is an elbow 94, approximately 90° between these two portions; however, there is no upper end. In this second embodiment, the cantilever section 92 is connected to the auxiliary grid 60. Preferably, this connection is spaced from the elbow 94 so that the grid 60 is cantilevered over the cooking grid 42.

The kettle bracket member 80 has a main body section 81 with an opening 84 therein to permit its being fastened to the bowl 11. The kettle bracket 80 can be easily retrofitted onto many existing kettles 10. This is accomplished by removing one of the nuts 33 cooperating with the abutment of an end 32 extending through an opening in the kettle's bowl and used to hold the cover holder 30 to the bowl 11. The exposed end 32 of the holder 30 is then put through the opening 84 of the kettle bracket 80. And, the nut 33 is put back in place and tightened down.

With respect to kettles that cannot be retrofitted, a generally U-shaped main body section having a set screw can be used. The main body would be placed over the lid 20 of the kettle's bowl 11 and the set screw would be tightened down to secure the bracket to the kettle 10.

The kettle bracket further has two parallel transverse portions 82 with apertures 83 therein projecting from the main section 84. The lower end 91 of the articulating arm 90 is threaded through the two apertures 83 in the transverse portions 82. Consequently, by this construction, the lower end 91 of the arm 90 can freely rotate in the bracket 80. The arm 90 is prevented from sliding entirely through the apertures 83 by the elbow 94, or by a stop placed around the lower end 91 just below the elbow, or by other conventional well known means.

In the preferred embodiment, the kettle bracket's main section 84 can extend upwardly and have its end arcuately bent, bent portion 89, to hook onto the lip 20 of the bottom bowl 11. This constructions prevents the bracket 80 from rotating once it has been fastened to the bowl 11.

The cantilever section 92 of the rigid articulating arm 90 is designed so as to support and maintain the auxiliary grid 60 spaced above the cooking grid 42 and the lip 20 of the kettle bowl 11 and the entire auxiliary grid assembly 60 out of contact with a closed barbecue cover 12. Accordingly, the rack 60 rotates in the horizontal plane.

While the articulating arm 90 may be welded to the auxiliary grid 61, it is appreciated that a second bracket, a rack bracket member, can be used to rotatably connect the grid 61 and the upper end 92 of the articulating arm 90. Specifically, a rack bracket member 85 can be constructed similarly to the kettle bracket member 80. Accordingly, this rack bracket 85 can be connected or fastened to the auxiliary grid 60 and can further include a main section 86 and two transverse projecting sections 87 with apertures 88 therein. The upper end 93 of the arm 90 would thusly be threaded through the two apertures 88 to permit rotation therein.

Having two brackets in the assembly 60, being the kettle bracket member 80 attached to the lower end 91 of the arm 90 and a rack bracket member 85 attached to the opposite upper end 93 of the arm 90, permits more versatility in the maneuvering of the auxiliary grid 61. Using dual pivots permits the user to swing the auxiliary grid 61 to many additional positions not previously obtainable with one bracket in the assembly.

While the specific embodiments have been illustrated and described, numerous modifications come to mind without significantly departing from the spirit of the invention and the scope of protection is only limited by the scope of the accompanying claims.

We claim:

1. An auxiliary rack assembly for suporting items above a cooking grid supported in a barbecue kettle comprising:
    an auxiliary grid for holding the items thereon, said auxiliary grid being substantially flat and having integral perimeter means for preventing the items placed on said auxiliary grid from falling off;
    means for maintaining said auxiliary grid in a constantly spaced position above the cooking grid; and
    means for rotatably connecting said grid and maintaining means to of the kettle.

2. The auxiliary rack assembly as defined in claim 1 wherein the means for maintaining the items is a rigid articulating arm, said arm having a lower end, a cantilever section and an elbow therebetween, said auxiliary grid being interconnected to said arm's cantilever section.

3. The auxiliary rack as defined in claim 2 wherein the means for rotatably connecting said holding and maintaining means is a kettle bracket member fastened to the bottom of the kettle, said bracket member including pivot rotating means therein for interconnecting said lower end of said arm.

4. An auxiliary rack assembly for supporting items in a constantly spaced position about a cooking grid supported in the bottom of a barbecue kettle comprising:
    a substantially flat auxiliary grid for holding the items thereon, said auxiliary grid having a rail secured to the perimeter of the auxiliary grid for preventing items on said auxiliary grid from falling off;
    a rigid articulating arm with an upper end, a cantilever section, a lower end and at least one elbow therein, said arm being interconnected at said upper end to said auxiliary grid for maintaining said grid spaced above the cooking grid; and.
    a kettle bracket member fastened to the bottom of the kettle and rotatably connecting said lower end of said arm.

5. An auxiliary rack assembly for supporting items in a constantly spaced position above a cooking grid supported in the bottom of a barbecue kettle comprising:
    an auxiliary grid for holding the items thereon;
    a rigid articulating arm with an upper end, a cantilever section, a lower end and at least one elbow therein, said arm being interconnected at said upper end to said auxiliary grid for maintaining said grid spaced above the cooking grid; and,
    a kettle bracket member fastened to the bottom of the kettle and rotatably connecting siad lower end of said arm, said bracket member having a main section attached to the kettle with two generally parallel transverse portions projecting therefrom, each said portion having an aperture for receiving said lower end of said articulating arm for permitting rotation therein.

6. The auxiliary rack assembly as defined in claim 5 wherein said auxiliary grid has a plurality of posts connected to its perimeter, said posts supporting a rail above said perimeter to prevent items from falling off said auxiliary grid.

7. The auxiliary rack assembly as defined in claim 6 wherein a rack bracket member is fastened to the auxiliary grid, said rack bracket member having a main section connected to the auxiliary grid with two generally parallel transverse portions projecting therefrom, each said portion having an aperture for receiving said upper end of said articulating arm for permitting rotation therein.

8. An auxiliary rack assembly fastened to a bottom of a barbecue kettle, said kettle bottom supporting a cooking grid therein, comprising:
    an auxiliary grid having a plurality of posts connected to said grid's perimeter for supporting a rail above said perimeter, and,
    a rigid articulating arm with two ends and a cantilever section disposed therebetween and separated therefrom by elbows, said arm being pivotally interconnected at both ends, one said interconnection being a kettle bracket member having a main section attached to the kettle with two generally parallel transverse portions projecting therefrom, each said portion having an aperture for receiving said lower end of said articulating arm and permitting rotation therein, said other interconnection being a rack bracket member having a main section attached to the auxiliary grid with two generally parallel transverse portions projecting therefrom, each said portion having an aperture for receiving said upper end of said articulating arm and permitting rotation therein, whereby said auxiliary grid can be pivoted in a horizontal plane and remain in a constant, spaced relationship above the cdooking grid.

9. An auxiliary rack assembly for supporting items above a cooking grid supported in a barbecue kettle comprising:

an auxiliary grid for holding the items thereon rotatably connected above the cooking grid, said auxiliary grid being substantially flat and having connected thereto integral perimeter means for preventing the items on said grid from falling off; and a rigid articulating arm interconnecting said auxiliary grid and the barbecue kettle, said arm having a lower end, a cantilever section and an elbow therebetween, said auxiliary grid being interconnected to said cantilever section of said arm.

* * * * *